US012356107B2

(12) United States Patent
Ni et al.

(10) Patent No.: US 12,356,107 B2
(45) Date of Patent: Jul. 8, 2025

(54) IMAGE SPECIAL EFFECT PROCESSING METHOD AND APPARATUS, AND ELECTRONIC DEVICE AND COMPUTER READABLE STORAGE MEDIUM

(71) Applicant: BEIJING BYTEDANCE NETWORK TECHNOLOGY CO., LTD., Beijing (CN)

(72) Inventors: Guangyao Ni, Beijing (CN); Shentao Wang, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/417,881

(22) Filed: Jan. 19, 2024

(65) Prior Publication Data

US 2024/0163392 A1 May 16, 2024

Related U.S. Application Data

(63) Continuation-in-part of application No. 17/590,797, filed on Feb. 1, 2022, now abandoned, which is a (Continued)

(30) Foreign Application Priority Data

Aug. 9, 2019 (CN) .......................... 201910735603.9

(51) Int. Cl.
*H04N 21/482* (2011.01)
*G06T 13/00* (2011.01)
(Continued)

(52) U.S. Cl.
CPC ............. *H04N 5/272* (2013.01); *G06T 13/00* (2013.01); *H04N 5/265* (2013.01)

(58) Field of Classification Search
CPC ...... H04N 5/272; H04N 5/265; H04N 5/2621; G06T 7/70; G06T 5/008;
(Continued)

(56) References Cited

U.S. PATENT DOCUMENTS 5,815,143 A * 9/1998 Jenney ................... G09G 5/393
715/781
5,920,325 A * 7/1999 Morgan .................. G06T 13/00
345/473
(Continued)

FOREIGN PATENT DOCUMENTS

CN 101617531 A 12/2009
CN 103209312 A 7/2013
(Continued)

OTHER PUBLICATIONS

International Patent Application No. PCT/CN2020/106236; Int'l Search Report; dated Nov. 3, 2020; 3 pages.
(Continued)

*Primary Examiner* — Philip P. Dang
(74) *Attorney, Agent, or Firm* — BakerHostetler

(57) ABSTRACT

A method and a device for performing special effect processing on an image, an electronic apparatus, and a computer-readable storage medium are provided. The method includes: acquiring a video; arranging a preset movable window on the video, where the window moves on the video; determining a current image based on a current play progress of the video; acquiring, from a data storage layer by an image acquisition unit of a rendering layer, a historical image when the window is moved to a preset position; combining the historical image and the current image by an animation logic processing unit of a script layer and a special
(Continued)

effect unit of the rendering layer; and outputting the combined image and displaying the combined image on a terminal screen.

18 Claims, 8 Drawing Sheets

Related U.S. Application Data continuation of application No. PCT/CN2020/106236, filed on Jul. 31, 2020.

(51) Int. Cl.
*H04N 5/265* (2006.01)
*H04N 5/272* (2006.01)

(58) Field of Classification Search
CPC . G06T 2207/20221; G06T 5/50; G06T 13/00; G06T 5/00
See application file for complete search history.

(56) References Cited

U.S. PATENT DOCUMENTS

| | | | | |
|---|---|---|---|---|
| 6,504,990 B1* | 1/2003 | Abecassis | .......... | H04N 7/17318 348/E7.071 |
| 7,346,920 B2* | 3/2008 | Lamkin | .......... | H04L 67/34 725/112 |
| 7,364,306 B2* | 4/2008 | Margulis | .......... | H04N 9/3155 348/742 |
| 7,404,645 B2* | 7/2008 | Margulis | .......... | G03B 21/2053 353/121 |
| 7,430,360 B2* | 9/2008 | Abecassis | .......... | H04N 7/17318 348/E7.071 |
| 7,432,940 B2* | 10/2008 | Brook | .......... | G11B 27/11 715/726 |
| 7,511,718 B2* | 3/2009 | Subramanian | .......... | G06F 9/545 345/473 |
| 8,374,383 B2* | 2/2013 | Long | .......... | G06T 7/70 382/100 |
| 9,183,560 B2* | 11/2015 | Abelow | .......... | G06Q 30/0601 |
| 9,554,037 B2* | 1/2017 | Lee | .......... | G06F 3/04845 |
| 9,589,354 B2* | 3/2017 | Wells | .......... | G06F 3/04815 |
| 9,669,306 B2* | 6/2017 | Perlman | .......... | A63F 13/45 |
| 9,756,349 B2* | 9/2017 | Perlman | .......... | H04N 19/46 |
| 10,416,952 B2* | 9/2019 | Cyr | .......... | G06T 3/40 |
| 10,499,118 B2* | 12/2019 | Todd | .......... | H04N 21/816 |
| 10,771,863 B2* | 9/2020 | Mathur | .......... | G06Q 10/0633 |
| 10,820,067 B2* | 10/2020 | Mathur | .......... | G06Q 10/103 |
| 2004/0095474 A1* | 5/2004 | Matsufune | .......... | G11B 27/034 348/E5.051 |
| 2005/0251732 A1* | 11/2005 | Lamkin | .......... | G06F 16/9577 715/202 |
| 2011/0107220 A1* | 5/2011 | Perlman | .......... | H04N 21/2381 715/720 |
| 2012/0262462 A1 | 10/2012 | Montan et al. | | |
| 2014/0320529 A1* | 10/2014 | Roberts | .......... | G06T 19/006 345/633 |
| 2015/0010234 A1 | 1/2015 | Daisy | | |
| 2015/0206444 A1* | 7/2015 | Vahid | .......... | G06F 40/143 434/362 |
| 2020/0007956 A1* | 1/2020 | Mathur | .......... | G06Q 10/103 |

FOREIGN PATENT DOCUMENTS

| | | | |
|---|---|---|---|
| CN | 103702220 A | 4/2014 | |
| CN | 104766361 A | 7/2015 | |
| CN | 107820026 A | 3/2018 | |
| CN | 108055477 A | 5/2018 | |
| CN | 109064539 A | 12/2018 | |
| CN | 109168026 A | 1/2019 | |
| CN | 109712013 A | 5/2019 | |
| CN | 110049371 A | 7/2019 | |
| CN | 110070585 A | 7/2019 | |
| EP | 2808871 A1 | 12/2014 | |
| JP | H05-227475 A | 9/1993 | |
| JP | 2001-285711 A | 10/2001 | |
| JP | 2003078817 A * | 3/2003 | ............. G06T 11/60 |
| JP | 2004-297399 A | 10/2004 | |
| JP | 2011-166594 A | 8/2011 | |
| WO | WO 2007/111206 A1 | 10/2007 | |
| WO | WO 2017/029849 A1 | 2/2017 | |

OTHER PUBLICATIONS

Written Opinion for International Application No. PCT/CN2020/106236, mailed Nov. 3, 2020, 07 Pages.

* cited by examiner

IMAGE SPECIAL EFFECT PROCESSING METHOD AND APPARATUS, AND ELECTRONIC DEVICE AND COMPUTER READABLE STORAGE MEDIUM

CROSS-REFERENCE TO RELATED APPLICATION

The present application is a continuation-in-part of U.S. patent application Ser. No. 17/590,797, filed on Feb. 1, 2022, which is a continuation application of International Patent Application No. PCT/CN2020/106236, titled "IMAGE SPECIAL EFFECT PROCESSING METHOD AND APPARATUS, AND ELECTRONIC DEVICE AND COMPUTER READABLE STORAGE MEDIUM", filed on Jul. 31, 2020, which claims priority to Chinese Patent Application No. 201910735603.9, titled "IMAGE SPECIAL EFFECT PROCESSING METHOD AND APPARATUS, AND ELECTRONIC DEVICE AND COMPUTER READABLE STORAGE MEDIUM", filed on Aug. 9, 2019 with the China National Intellectual Property Administration, all of which are incorporated herein by reference in their entireties.

FIELD

The present disclosure relates to the technical field of special effect processing for images, and in particular to a method and a device for performing special effect processing on an image, an electronic apparatus, and a computer-readable storage medium.

BACKGROUND

With the development of smart terminal technology, functions of smart terminals are increasingly diverse. For example, a user can use a camera of a terminal to take images (for example, photos or videos), which has become a new mode of entertainment for people. However, shooting images cannot meet the needs of users. How to perform special effect processing on the captured images to acquire fun and interesting images has become the focus of attention.

In the conventional technology, the captured images are usually post-produced to obtain images with special effects, which is not real-time and cannot perform special effect processing on an input image in real time. Alternatively, developers write programs for each special effect, which is inflexible. In addition, multiple implementations are required in order to achieve multiple special effects, which results in a large program, complicated implementation, and is time-consuming and labor-intensive.

SUMMARY

The summary is provided to introduce concepts in a brief form, and these concepts will be described in detail in the following specific embodiments. This summary is neither intended to indicate key or essential features of the technical solutions that are requested to be protected, nor intended to limit the scope of the technical solutions that are requested to be protected.

A method for performing special effect processing on an image is provided according to the present disclosure, so as to at least partially solve the technical problems of complicated and inflexible implementation of image special effects in the conventional technology. In addition, a device for performing special effect processing on an image, a hardware device for performing special effect processing on an image, a computer-readable storage medium, and a terminal for performing special effect processing on an image are further provided.

In order to achieve the above objective, the following technical solutions are provided according to an aspect of the present disclosure. A method for performing special effect processing on an image includes: acquiring a video; arranging a preset movable window on the video, where the window moves on the video; determining a current image based on a current play progress of the video; acquiring, from a data storage layer by an image acquisition unit of a rendering layer, a historical image when the window is moved to a preset position; combining the historical image and the current image by an animation logic processing unit of a script layer and a special effect unit of the rendering layer; and outputting the combined image and displaying the combined image on a terminal screen.

In order to achieve the above objective, the following technical solutions are provided according to an aspect of the present disclosure. A device for performing special effect processing on an image includes a video acquisition module, a window movement module, a current image determination module, a historical image acquisition module, a combination processing module and an image display module. The video acquisition module is configured to acquire a video. The window movement module is configured to arrange a preset movable window on the video, where the window moves on the video. The current image determination module is configured to determine a current image based on a current play progress of the video. The historical image acquisition module is configured to acquire, from a data storage layer via an image acquisition unit of a rendering layer, a historical image when the window is moved to a preset position. The combination processing module is configured to combine the historical image and the current image via an animation logic processing unit of a script layer and a special effect unit of the rendering layer. The image display module is configured to output the combined image and display the combined image on a terminal screen.

In order to achieve the above objective, the following technical solutions are provided according to an aspect of the present disclosure. An electronic apparatus includes a memory and a processor. The memory is configured to store non-transitory computer-readable instructions. The processor is configured to execute the computer-readable instructions to implement the method for performing special effect processing on an image as described in the above aspect.

In order to achieve the above objective, the following technical solutions are provided according to an aspect of the present disclosure. A computer-readable storage medium is configured to store non-transitory computer-readable instructions that, when being executed by a computer, cause the computer to implement the method for performing special effect processing on an image as described in the above aspect.

In order to achieve the above objective, the following technical solutions are provided according to an aspect of the present disclosure. A terminal for performing special effect processing on an image includes the device for performing special effect processing on an image as described in the above aspect.

In the embodiments of the present disclosure, the image acquisition unit of the rendering layer acquires, from the data storage layer, a historical image when a window is moved to a preset position. The animation logic processing unit of the script layer and the special effect unit of the rendering layer combine the historical image and the current image. The combined image is outputted and displayed on the terminal screen. In this way, special effects can be accomplished by only modifying the rendering layer, which is relatively simple and flexible for implementation.

The above description is only an overview of the technical solutions of the present disclosure. In order to have a clearer understanding of the technical means of the present disclosure so that the technical solutions can be implemented in accordance with the specification, and to make the above and other objectives, features and advantages of the present disclosure understandable, the preferred embodiments are described in detail below in conjunction with the accompanying drawings.

BRIEF DESCRIPTION OF THE DRAWINGS

The above and other features, advantages, and aspects of the embodiments of the present disclosure will become more apparent in conjunction with the accompanying drawings and with reference to the following specific implementations. Throughout the drawings, the same or similar reference signs indicate the same or similar elements. It should be understood that the drawings are illustrative and components and elements are unnecessarily drawn to scale.

DETAILED DESCRIPTION OF EMBODIMENTS

Figure 1:
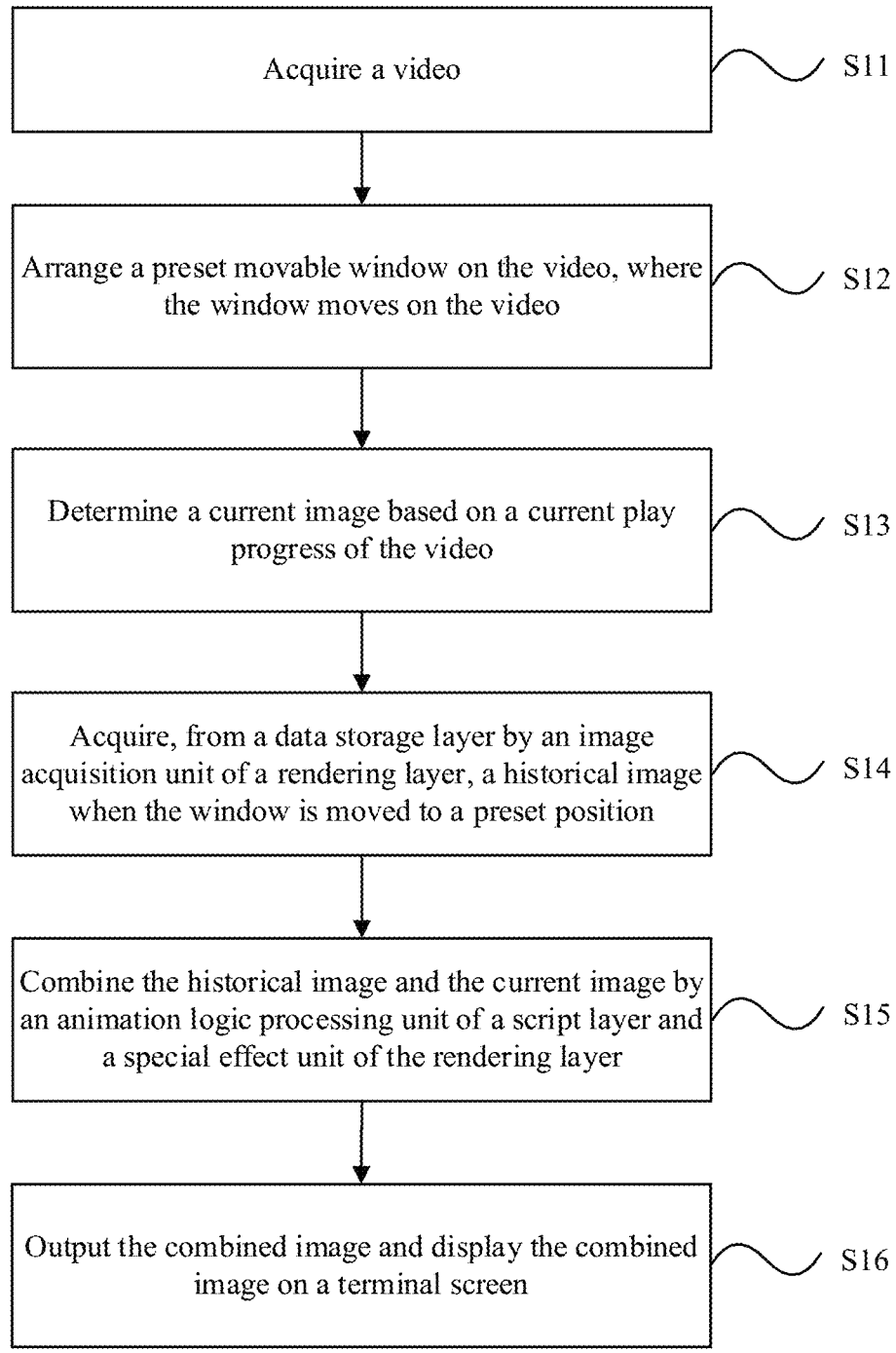
FIG. 1 is a schematic flowchart of a method for performing special effect processing on an image according to an embodiment of the present disclosure.

Hereinafter, embodiments of the present disclosure are described in more detail with reference to the accompanying drawings. Although some embodiments of the present disclosure are shown in the drawings, it should be understood that the present disclosure can be implemented in various forms and should not be construed as being limited to the embodiments set forth herein. Instead, these embodiments are provided for a more thorough and complete understanding of the present disclosure. It should be understood that the drawings and embodiments of the present disclosure are only for illustration, and are not used to limit the protection scope of the present disclosure.

It should be understood that the various steps recorded in the method embodiment of the present disclosure may be performed in a different order, and/or performed in parallel. In addition, the method embodiment may include additional steps and/or omitted steps. The scope of the present disclosure is not limited in this respect.

The term "including" and its variations as used herein indicate open-ended inclusion, that is, "including but not limited to". The term "based on" means "based at least in part on". The term "an embodiment" means "at least one embodiment". The term "another embodiment" means "at least one additional embodiment". The term "some embodiments" means "at least some embodiments". Definitions of other terms will be given in the following description.

First Embodiment

In order to solve the technical problems of complicated and inflexible implementation of image special effects in the conventional technology, a method for performing special effect processing on an image is provided according to the embodiment of the present disclosure. As shown in FIG. 1, the method for performing special effect processing on an image includes the following steps S11 to S16.

In step S11, a video is acquired.

The video may be a video stream inputted in real time, for example, a live video in a short video application. Alternatively, the video may be pre-stored in a terminal. The terminal may be a mobile terminal such as a smartphone, a tablet computer, or a fixed terminal such as a desktop computer.

In step S12, a preset movable window is arranged on the video, where the window moves on the video.

A size of the window is set based on a terminal screen, and the window is a horizontal window or a vertical window. For example, a width of the window is equal to a width of the terminal screen, and a height of the window is one-fifth of a height of the terminal screen. Alternatively, the width of the window is one-fifth of the width of the terminal screen, and the height of the window is equal to the height of the terminal screen.

In a case that the window is a horizontal window, the window moves from bottom to top or from top to bottom along the terminal screen. In a case that the window is a vertical window, the window moves from left to right or from right to left along the terminal screen.

In step S13, a current image is determined based on a current play progress of the video.

The current image is an image played at a current moment.

The current moment may be customized by a user.

The video is played on the terminal screen. When having a demand or watching an image of interest, the user acquires the current image by triggering a corresponding button, such as taking a photo or taking a screenshot of the terminal screen.

In step S14, an image acquisition unit of a rendering layer acquires, from a data storage layer, a historical image when the window is moved to a preset position.

The data storage layer is configured to store a historical image. For example, the data storage layer includes a cache, and the historical image is stored in the cache so that the historical image is stored and acquired quickly.

The number of the historical image may be one or more.

In step S15, an animation logic processing unit of a script layer and a special effect unit of the rendering layer combine the historical image and the current image.

The script layer includes script programs and script files required for running the script programs. The rendering layer is controlled by setting logic in a script.

The animation logic processing unit is configured to determine a position of the window.

The special effect unit is configured to draw the historical image and the current image, and perform combined rendering.

In step S16, the combined image is outputted and displayed on the terminal screen.

In this embodiment, the image acquisition unit of the rendering layer acquires, from the data storage layer, the historical image when the window is moved to a preset position. The animation logic processing unit of the script layer and the special effect unit of the rendering layer combine the historical image and the current image. The combined image is outputted and displayed on the terminal screen. In this way, special effects can be accomplished by only modifying the rendering layer, which is relatively simple and flexible for implementation.

In an alternative embodiment, the method further includes: capturing, by an image capture unit of the rendering layer from the video, an image when the window is moved to the preset position, as a historical image; and storing the captured image in the data storage layer.

The preset position may be customized by the user. For example, when the window moves from bottom to top along the terminal screen, the preset position may be an upper boundary of the terminal screen. When the window moves from top to bottom along the terminal screen, the preset position may be a lower boundary of the terminal screen. When the window moves from left to right along the terminal screen, the preset position may be a right boundary of the terminal screen. When the window moves from right to left along the terminal screen, the preset position may be a left boundary of the terminal screen.

In an alternative embodiment, step S15 includes the following steps S151 to S153.

In step S151, the animation logic processing unit of the script layer determines a position of the window in a blank image.

In step S152, the special effect unit of the rendering layer draws the window at the position, draws the historical image inside the window, and draws the current image outside the window.

In step S153, the image inside the window and the image outside the window are combined to obtain an image.

In an alternative embodiment, the method further includes: controlling a movement period of the window by a counter of the script layer.

In an alternative embodiment, the method further includes: controlling an execution period of the animation logic processing unit by the counter of the script layer.

In an alternative embodiment, the method further includes: sending an image acquisition instruction to the image acquisition unit of the rendering layer via the script layer, to trigger the image acquisition unit.

The script layer includes script programs and script files required for running the script programs. The rendering layer is controlled by setting logic in a script. For example, the image acquisition instruction is sent to the image acquisition unit of the rendering layer, so that the image acquisition unit acquires a historical image of the video from the data storage layer in response to the image acquisition instruction.

In an alternative embodiment, the method further includes: sending a control instruction to the special effect unit of the rendering layer via the script layer, to trigger the special effect unit.

The rendering layer is controlled by setting logic in a script. For example, a special effect is completed by controlling the special effect unit of the rendering layer. That is, the control instruction is sent to the special effect unit of the rendering layer, and the special effect unit superimposes the historical image and the current image in response to the control instruction.

In an alternative embodiment, the method further includes: sending an image capture instruction to the image capture unit of the rendering layer via the script layer, to trigger the image capture unit.

The rendering layer is controlled by setting logic in a script. For example, the image capture instruction is sent to the image capture unit of the rendering layer via the script layer, and the image capture unit captures an image in response to the capture instruction, and caches the captured image in the storage layer.

In addition, the image capture instruction includes at least one of the following parameters: an image identification, image coordinates, an image width, an image height, and resolution of the terminal screen.

The image identification is a serial number or a name of the captured image, and may be randomly generated when the image is captured.

The image coordinates are start and end coordinates of the captured image, including x and y coordinates. For example, the image coordinates include the coordinates of the upper left corner and the lower right corner of the terminal screen. The image coordinates may specifically be normalized coordinates. In the case of normalized coordinates, actual coordinates are calculated according to resolution of the terminal screen. For example, a product of the normalized coordinates and the resolution of the terminal screen serves as the actual coordinates.

The image width is the width of the captured image.

The image height is the height of the captured image.

Those skilled in the art should understand that, modifications (for example, combining the listed modes) or equivalent substitutions may be made on the above various embodiments.

In the above, the steps in the embodiment of the method for performing special effect processing on an image are described in the order described above. It should be clear to those skilled in the art that the steps in the embodiments of the present disclosure are unnecessarily performed in the above order, but may be performed in other orders such as in reverse, in parallel, and alternately. Moreover, on the basis of the above steps, those skilled in the art may add other steps, and these modifications or equivalent substitutions should also be included in the protection scope of the present disclosure, and are not described in detail herein.

The device embodiment according to the present disclosure is described below. The device according to the present disclosure is configured to perform the steps in the method embodiment of the present disclosure. For ease of description, only the parts related to the embodiments of the present disclosure are shown. For specific technical details that are not disclosed, reference is made to the method embodiment of the present disclosure.

Second Embodiment

Figure 2:
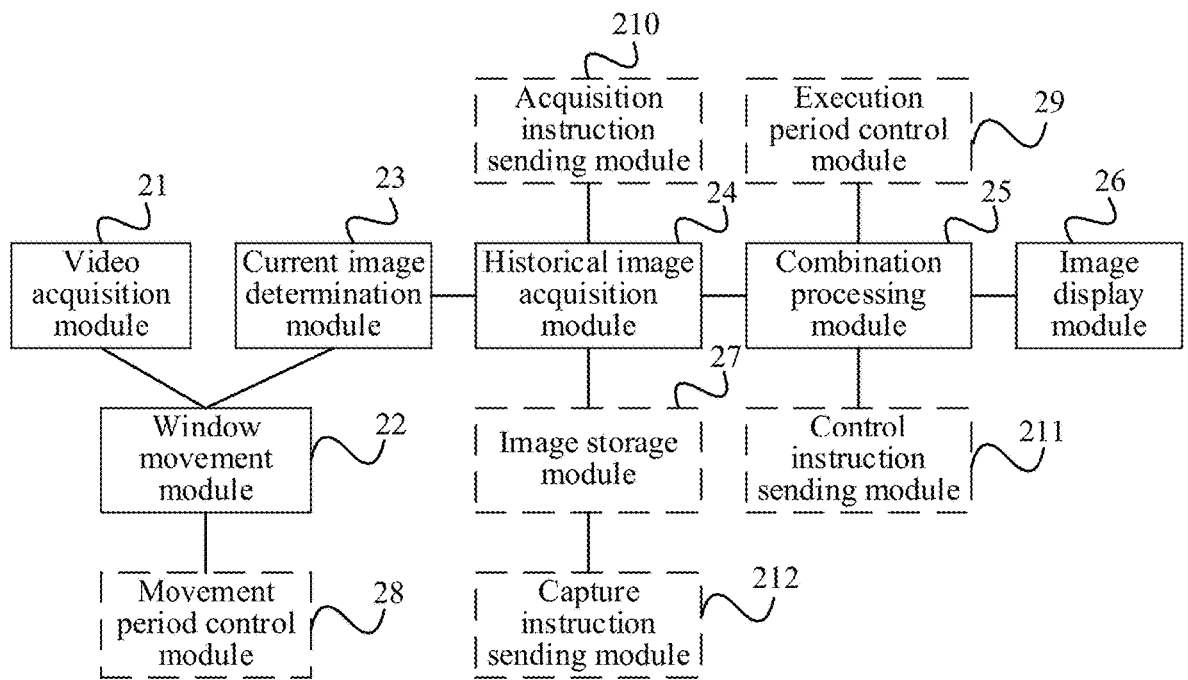
FIG. 2 is a schematic flowchart showing processing performed by a device for performing special effect processing on an image according to an embodiment of the present disclosure.

In order to solve the technical problems of complicated and inflexible implementation of image special effects in the conventional technology, a device for performing special effect processing on an image is provided according to the embodiment of the present disclosure. The device can perform the steps of the method for performing special effect processing on an image as described in the first embodiment. As shown in FIG. 2, the device includes a video acquisition module 21, a window movement module 22, a current image determination module 23, a historical image acquisition module 24, a combination processing module 25 and an image display module 26.

The video acquisition module 21 is configured to acquire a video.

The window movement module 22 is configured to arrange a preset movable window on the video, where the window moves on the video.

The current image determination module 23 is configured to determine a current image based on a current play progress of the video.

The historical image acquisition module 24 is configured to acquire, from a data storage layer via an image acquisition unit of a rendering layer, a historical image when the window is moved to a preset position.

The combination processing module 25 is configured to combine the historical image and the current image via an animation logic processing unit of a script layer and a special effect unit of the rendering layer.

The image display module 26 is configured to output the combined image and display the combined image on a terminal screen.

In addition, the device further includes an image storage module 27. The image storage module 27 is configured to capture, from the video by an image capture unit of the rendering layer, an image when the window is moved to a preset position as a historical image, and store the captured image in the data storage layer.

In addition, the combination processing module 25 is configured to: determine a position of the window in a blank image via the animation logic processing unit of the script layer; via the special effect unit of the rendering layer, draw the window at the position, draw the historical image inside the window, and draw the current image outside the window; and combine the image inside the window and the image outside the window to obtain an image.

In addition, the device further includes a movement period control module 28. The movement period control module 28 is configured to control a movement period of the window via a counter of the script layer.

In addition, the device further includes an execution period control module 29. The execution period control module 29 is configured to control an execution period of the animation logic processing unit via the counter of the script layer.

In addition, the device further includes an acquisition instruction sending module 210. The acquisition instruction sending module 210 is configured to send an image acquisition instruction to the image acquisition unit of the rendering layer via the script layer, to trigger the image acquisition unit.

In addition, the device further includes a control instruction sending module 211. The control instruction sending module 211 is configured to send a control instruction to the special effect unit of the rendering layer via the script layer, to trigger the special effect unit.

In addition, the device further includes a capture instruction sending module 212. The capture instruction sending module 212 is configured to send an image capture instruction to the image capture unit of the rendering layer via the script layer, to trigger the image capture unit.

In addition, the image capture instruction includes at least one of the following parameters: an image identification, image coordinates, an image width, an image height, and resolution of the terminal screen.

For detailed descriptions of the operation principle and technical effects of the embodiment of the device for performing special effect processing on an image, reference is made to the relevant description in the above embodiments of the method for performing special effect processing on an image. Therefore, the operation principle and technical effects of the embodiment of the device for performing special effect processing on an image are not described in detail herein.

Third Embodiment

Figure 3:
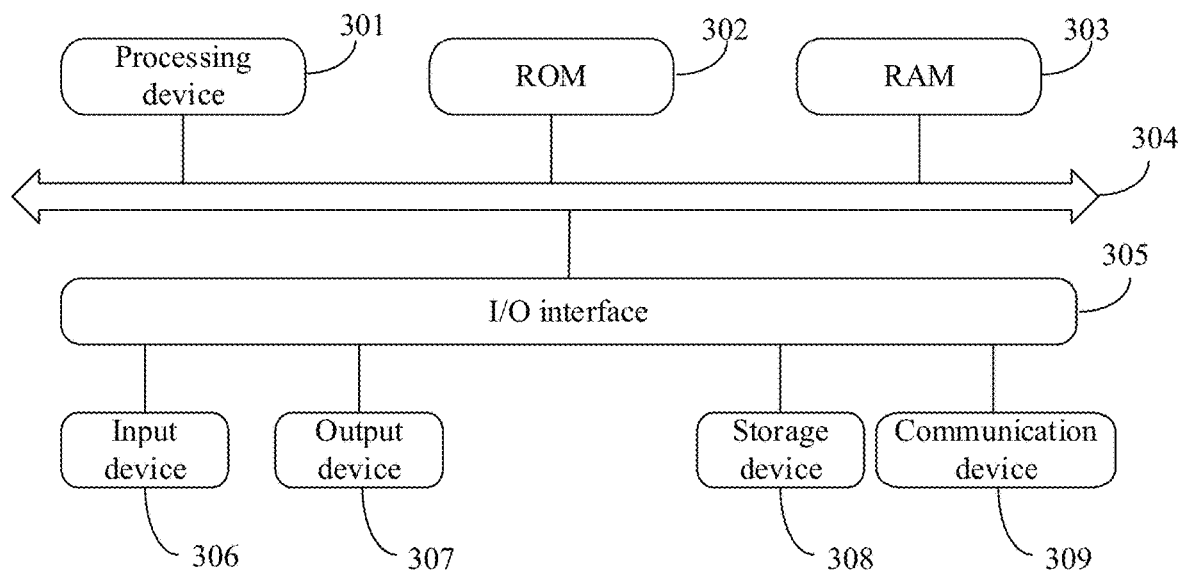
FIG. 3 is a schematic structural diagram of an electronic apparatus according to an embodiment of the present disclosure.

Reference is made to FIG. 3, which is a schematic structural diagram of an electronic apparatus 300 for implementing the embodiments of the present disclosure. The terminal apparatus according to the embodiment of the present disclosure may include, but is not limited to, a mobile terminal such as a mobile phone, a notebook computer, a digital broadcast receiver, a PDA (personal digital assistant), a PAD (tablet), a PMPs (portable multimedia player), a vehicle-mounted terminal (such as a vehicle navigation terminal) and the like, and a fixed terminal such as a digital TV, a desktop computer and the like. The electronic apparatus shown in FIG. 3 is only an example, and should not bring any limitation to the function and scope of use of the embodiments of the present disclosure.

As shown in FIG. 3, the electronic apparatus 300 includes a processing device (for example, a central processing unit, a graphics processing unit or the like) 301. The processing device 301 performs various appropriate actions and processing in accordance with a program stored in a read only memory (ROM) 302 or a program loaded from a storage device 306 into a random-access memory (RAM) 303. Various programs and data required for the operation of the electronic apparatus 300 are also stored in the RAM 303. The processing device 301, the ROM 302, and the RAM 303 are connected to each other via a bus 304. An input/output (I/O) interface 305 is also connected to the bus 304.

Generally, the following devices are connected to the I/O interface 305: an input device 306 including a touch screen, a touch pad, a keyboard, a mouse, a camera, a microphone, an accelerometer, a gyroscope or the like; an output device 307 including a liquid crystal display (LCD), a speaker, a vibrator or the like; a storage device 306 including a magnetic tape, a hard disk or the like; and a communication device 309. The electronic apparatus 300 performs wireless or wired communication with another apparatus via the communication device 309 to exchange data. Although FIG. 3 shows an electronic apparatus 300 having various devices, it should be understood that it is unnecessarily to implement or have all of the illustrated devices. It may alternatively be implemented or provided with more or fewer devices.

In particular, according to an embodiment of the present disclosure, the process described above with reference to the flowchart may be implemented as a computer software program. For example, a computer program product is provided according to an embodiment of the present disclosure. The computer program product includes a computer program carried on a non-transitory computer-readable medium, and the computer program includes program code for performing the method shown in the flowchart. In this embodiment, the computer program may be downloaded and installed from the network, or installed from the storage device 306, or installed from the ROM 302 via the communication device 309. When the computer program is executed by the processing device 301, the above functions defined in the method of the embodiment of the present disclosure are implemented.

It should be noted that the above computer-readable medium in the present disclosure may be a computer-readable signal medium or a computer-readable storage medium, or any combination of the computer-readable signal medium and the computer-readable storage medium. The computer-readable storage medium includes, for example, but is not limited to, an electrical, magnetic, optical, electromagnetic, infrared, or semiconductor system, device, or component, or a combination of any of the above. More specific examples of the computer-readable storage medium may include, but are not limited to: electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, and the data signal carries a computer-readable program code. This propagated data signal may be in various forms, including but not limited to an electromagnetic signal, an optical signal, or any suitable combination of the electromagnetic signal and the optical signal. The computer-readable signal medium may also be any computer-readable medium other than the computer-readable storage medium. The computer-readable signal medium may send, propagate, or transmit the program for being used by or in combination with the instruction execution system, apparatus, or device. The program code included in the computer-readable medium may be transmitted via any suitable medium, including but not limited to a wire, an optical cable, RF (radio frequency), or any suitable combination of the above.

In some embodiments, a client and a server can perform communications based on any currently known or future developed network protocol such as HTTP (Hyper Text Transfer Protocol), and can communicate with any form or medium of digital data (for example, communication network). The communication network includes a local area network ("LAN"), a wide area network ("WAN"), network in network (for example, the Internet), and an end-to-end network (for example, the ad hoc end-to-end network), as well as any network currently known or developed in the future.

The above computer-readable medium may be included in the above electronic apparatus or may exist independently without being assembled into the electronic apparatus.

The above computer-readable medium carries one or more programs. When executing the one or more programs mentioned above, the electronic apparatus: acquires a video; arranges a preset movable window on the video, where the window moves on the video; determines a current image based on a current play progress of the video; acquires, from a data storage layer via an image acquisition unit of a rendering layer, a historical image when the window is moved to a preset position; combines the historical image and the current image via an animation logic processing unit of a script layer and a special effect unit of the rendering layer; and outputs the combined image and displays the combined image on a terminal screen.

The computer program code for performing the operations of the present disclosure may be written in one or more programming languages or a combination thereof. The above programming languages include, but are not limited to, object-oriented programming languages-such as Java, Smalltalk, C++, and conventional procedural programming languages such as "C" language or similar programming languages. The program code may be executed entirely on a user computer, partly executed on the user computer, executed as an independent software package, partly executed on the user computer and partly executed on a remote computer, or entirely executed on a remote computer or a server. In the case of a remote computer, the remote computer may be connected to the user computer via any network, including a local area network (LAN) or a wide area network (WAN). Alternatively, the remote computer is connected to an external computer (for example, via the Internet provided by an Internet service provider).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code. The module, program segment, or part of the code contains one or more executable instructions for realizing a specified logic function. It should also be noted that, in some alternative implementations, the functions marked in the blocks may also occur in a different order from the order marked in the drawings. For example, two blocks shown in succession may be performed in parallel, or may be performed in a reverse order, depending on the functions involved. It should also be noted that each block in the block diagram and/or flowchart, and the combination of the blocks in the block diagram and/or flowchart, may be implemented by a dedicated hardware-based system that performs the specified functions or operations, or may be implemented by a combination of dedicated hardware and computer instructions.

The units involved in the embodiments described in the present disclosure may be implemented in software or hardware. The name of the unit under certain circumstances does not constitute a limitation on the unit itself.

The functions described hereinabove may be performed at least in part by one or more hardware logic components. For example, without limitation, exemplary hardware logic components that can be used include: a field programmable gate array (FPGA), an application specific integrated circuit (ASIC), an application specific standard product (ASSP), a system on chip (SOC), a complex programmable logical device (CPLD) and so on.

In the context of the present disclosure, a machine-readable medium may be a tangible medium, and contains or stores a program for being used by or in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or apparatus, or any suitable combination of the above. More specific examples of the machine-readable storage medium include electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

A method for performing special effect processing on an image is provided according to one or more embodiments of the present disclosure. The method includes: acquiring a video; arranging a preset movable window on the video, where the window moves on the video; determining a current image based on a current play progress of the video; acquiring, from a data storage layer by an image acquisition unit of a rendering layer, a historical image when the window is moved to a preset position; combining the historical image and the current image by an animation logic processing unit of a script layer and a special effect unit of the rendering layer; and outputting the combined image and displaying the combined image on a terminal screen.

In addition, the method further includes: capturing, by an image capture unit of the rendering layer from the video, an image when the window is moved to the preset position, as a historical image; and storing the captured image in the data storage layer.

In addition, the combining the historical image and the current image by an animation logic processing unit of a script layer and a special effect unit of the rendering layer includes: determining a position of the window in a blank image by the animation logic processing unit of the script layer; by the special effect unit of the rendering layer, drawing the window at the position, drawing the historical image inside the window, and drawing the current image outside the window; and combining the image inside the window and the image outside the window to obtain an image.

In addition, the method further includes: controlling a movement period of the window by a counter of the script layer.

In addition, the method further includes: controlling an execution period of the animation logic processing unit by the counter of the script layer.

In addition, the method further includes: sending an image acquisition instruction to the image acquisition unit of the rendering layer via the script layer, to trigger the image acquisition unit.

In addition, the method further includes: sending a control instruction to the special effect unit of the rendering layer via the script layer, to trigger the special effect unit.

In addition, the method further includes: sending an image capture instruction to the image capture unit of the rendering layer via the script layer, to trigger the image capture unit.

In addition, the image capture instruction includes at least one of the following parameters: an image identification, image coordinates, an image width, an image height, and resolution of the terminal screen.

A device for performing special effect processing on an image is provided according to one or more embodiments of the present disclosure. The device includes a video acquisition module, a window movement module, a current image determination module, a historical image acquisition module, a combination processing module and an image display module. The video acquisition module is configured to acquire a video. The window movement module is configured to arrange a preset movable window on the video, where the window moves on the video. The current image determination module is configured to determine a current image based on a current play progress of the video. The historical image acquisition module is configured to acquire, from a data storage layer via an image acquisition unit of a rendering layer, a historical image when the window is moved to a preset position. The combination processing module is configured to combine the historical image and the current image via an animation logic processing unit of a script layer and a special effect unit of the rendering layer. The image display module is configured to output the combined image and display the combined image on a terminal screen.

In addition, the device further includes an image storage module. The image storage module is configured to capture, from the video by an image capture unit of the rendering layer, an image when the window is moved to a preset position as a historical image, and store the captured image in the data storage layer.

In addition, the combination processing module is configured to: determine a position of the window in a blank image via the animation logic processing unit of the script layer; via the special effect unit of the rendering layer, draw the window at the position, draw the historical image inside the window, and draw the current image outside the window; and combine the image inside the window and the image outside the window to obtain an image.

In addition, the device further includes a movement period control module. The movement period control module is configured to control a movement period of the window via a counter of the script layer.

In addition, the device further includes an execution period control module. The execution period control module is configured to control an execution period of the animation logic processing unit via the counter of the script layer.

In addition, the device further includes an acquisition instruction sending module. The acquisition instruction sending module is configured to send an image acquisition instruction to the image acquisition unit of the rendering layer via the script layer, to trigger the image acquisition unit.

In addition, the device further includes a control instruction sending module. The control instruction sending module is configured to send a control instruction to the special effect unit of the rendering layer via the script layer, to trigger the special effect unit.

In addition, the device further includes a capture instruction sending module. The capture instruction sending module is configured to send an image capture instruction to the image capture unit of the rendering layer via the script layer, to trigger the image capture unit.

In addition, the image capture instruction includes at least one of the following parameters: an image identification, image coordinates, an image width, an image height, and resolution of the terminal screen.

An electronic apparatus is provided according to one or more embodiments of the present disclosure. The electronic apparatus includes a memory and a processor. The memory is configured to store non-transitory computer-readable instructions. The processor is configured to execute the computer-readable instructions to implement the method for performing special effect processing on an image as described above.

A computer-readable storage medium is provided according to one or more embodiments of the present disclosure. The computer-readable storage medium is configured to store non-transitory computer-readable instructions that, when being executed by a computer, cause the computer to implement the method for performing special effect processing on an image as described above.

Only preferred embodiments of the present disclosure and an explanation of the applied technical principles are described above. Those skilled in the art should understand that the scope of disclosure involved in this specification is not limited to the technical solutions formed by the specific combination of the above technical features, and should also cover other technical solutions formed by any combination of the above technical features or their equivalent features without departing from the above disclosed concept. For example, the scope of disclosure involved in this specification also includes technical solutions formed by the above-mentioned features and the technical features disclosed in this specification (but not limited to) with similar functions being replaced with each other.

In addition, although operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, which should not be construed as limiting the scope of the present disclosure. Features that are described in the context of separate embodiments may also be implemented in combination in a single embodiment. Conversely, various features described in the context of a single embodiment may also be implemented in multiple embodiments separately or in any suitable sub-combination.

Although the subject matter has been described in languages specific to structural features and/or logical operations of the method, it should be understood that the subject matter defined in the appended claims is unnecessarily limited to the specific features or operations described above. The specific features and operations described above are merely illustrative forms of implementing the claims.

Figure 4:
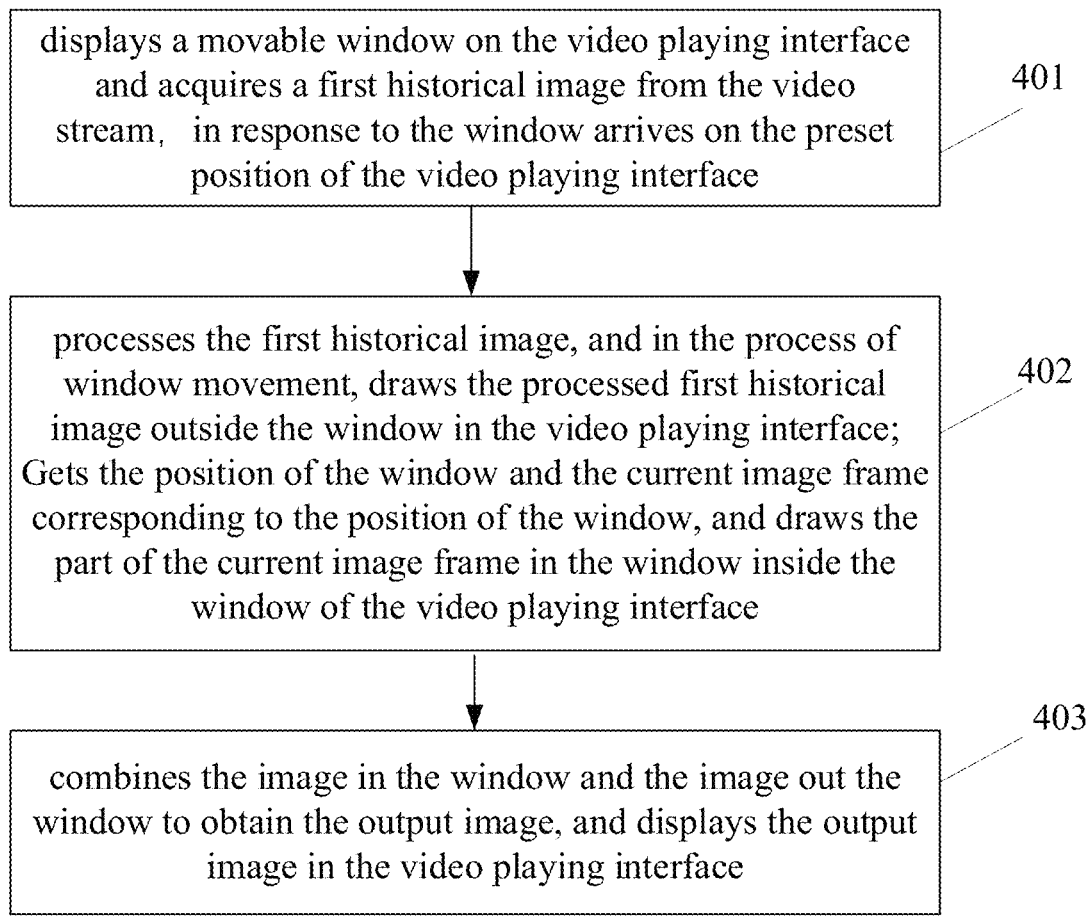
FIG. 4 is a schematic flowchart of a method for performing special effect processing on an image according to an embodiment of the present disclosure.

As shown in FIG. 4, which shows the method for performing special effect processing on a video.

In step 401, displays a movable window on the video playing interface and acquires a first historical image from the video stream, in response to the window arrives on the preset position of the video playing interface.

In Step 402, processes the first historical image, and in the process of window movement, draws the processed first historical image outside the window in the video playing interface; Gets the position of the window and the current image frame corresponding to the position of the window, and draws the part of the current image frame in the window inside the window of the video playing interface.

In Step 403, combines the image in the window and the image out the window to obtain the output image, and displays the output image in the video playing interface.

In an alternative embodiment, acquires a second historical image in response to the window arrives on the preset position of the video playing interface.

In an alternative embodiment, the window can move at a constant or variable speed on the video playing interface.

In an alternative embodiment, the width of the window can be different in different rounds of window movement in the video playing interface.

In an alternative embodiment, the position of the window can be determined based on the preset part of the window, for example, based on the position of the center of the window; For example, based on the position of the leftmost side of window; For example, based on the position of the rightmost side of the window.

In an alternative embodiment, gets the input image from the video stream, and determines the current window position. When the window moves to the rightmost side, the input image is stored in in the data storage layer. According to the logic of window movement, acquires the window position. Draws for the current frame into the window. The image in the data storage layer is processed with Gaussian blur and drawn outside the window. Combine images inside and outside the window to acquires output image.

In an alternative embodiment, acquiring a video; arranging a preset movable window on the video, wherein the window moves on the video; determining a current image based on a current play progress of the video; acquiring a historical image when the window is moved to a preset position; combining the historical image and the current image; and outputting the combined image and displaying the combined image on a terminal screen.

As shown in FIG. 5A, FIG. 5B, FIG. 5C, and FIG. 5D, which show the video playing on the video playing interface of the electronic device. In the video playing interface, a movable window can be set, for example, window 501, 502, and 503.

Figure 5A:
FIG. 5A is a schematic diagram of a scene of the present disclosure.
Figure 5B:
FIG. 5B is a schematic of a scenario of the present disclosure.
Figure 5C:
FIG. 5C is a schematic diagram of a scene of the present disclosure.

In an alternative embodiment, the window has an obvious border (as shown in FIG. 5A, FIG. 5C).

Figure 5D:
FIG. 5D is a schematic diagram of a scenario of the present disclosure.

In an alternative embodiment, the window do not have an obvious border (as shown in FIG. 5D).

The window can move at a constant or variable speed in the video playing interface. The time length of a move round can be pre-set. For example, the time for the moveable window to move one round from left to right is 10 seconds.

In an alternative embodiment, the video playing interface can play a pre-captured video. As an example, the length of time for a pre-captured video is 1 minute, and the time for the moveable window to move one round from left to right is 10 seconds. The movable window can be moved at a constant speed, can be moved at a variable speed, and the width of each window can be different.

For example, the window moves at a constant speed and the width of windows in different movement round are same, and then the movable window can move 6 rounds during the video playing process. It can be understood that in each round, the position that the window moves to is associated with the video playing progress; For example, in the first round of window movement, when the window moves to the rightmost end and disappears, the video playing progress is played to the 10th second.

As an example, FIG. 5A can be the image of the first second of the video, in other words, the movable window moves from left to right in the video playing interface, and the position of the window 501 is the leftmost side of the video playing interface when the video is started to play. When moving to the rightmost side of the video playing interface, the image of the 10th second is captured as the first historical image. And the first historical image (as shown in FIG. 5B) is stored to the data storage layer, where the first historical image can be associated with the video playing progress (for example, the 10th second) to ensure uniqueness.

During the second round of movement of the movable window, the current playing progress is determined according to the position to which the window is moved on, and the current image frame is determined according to the current playing progress. For example, as shown in FIG. 5C, when the video is played to the 15th second, the image frame of the 15th second is regarded as the current image, and the first historical image is obtained from the data storage layer as the historical image. Optionally, historical images can be processed, such as Gaussian blur for historical images.

Based on the historical image and the current image, combine into a new image; Or, based on the processed historical image and the current image, combine into a new image. In the new image, a part of the historical image (the image shown in FIG. 5B, that is, the image of the 10th second of the video) is displayed outside the window, and a part of the current image frame in the window is displayed in the window of the video playing interface (that is, window 502 as shown in FIG. 5C). The new image is displayed on the video playing interface as the 20th second image frame, as shown in FIG. 5C.

During the third round of playing, the video frame of the 20th second of the video is used as the historical image. FIG. 5D shows the image displayed in the video playing interface when the video is played to the 27th second, that is, the video frame image of the 20th second is displayed outside the window, and the video frame image of the 27th second is displayed inside the window.

In an alternative embodiment, the video playing interface can play video captured by a camera in real time. When the user is shooting a video with the camera, the movable window moves from left to right. Each time the user moves to the rightmost side of the video playing interface, the historical image captured when the movable window moves to the rightmost side is stored. Then, the moveable window starts the next round of movement from left to right. During the movement of the window, the video frame captured by the camera in real time is displayed in the "Moving window" of the video playing interface, and the historical image captured when the "moving window" was moved to the rightmost side last time is displayed outside the "Moving Window". That is, the "historical image" is the image captured when the "moveable window" is moved to the rightmost side last time, and the image is stored in the storage layer.

Figure 6:
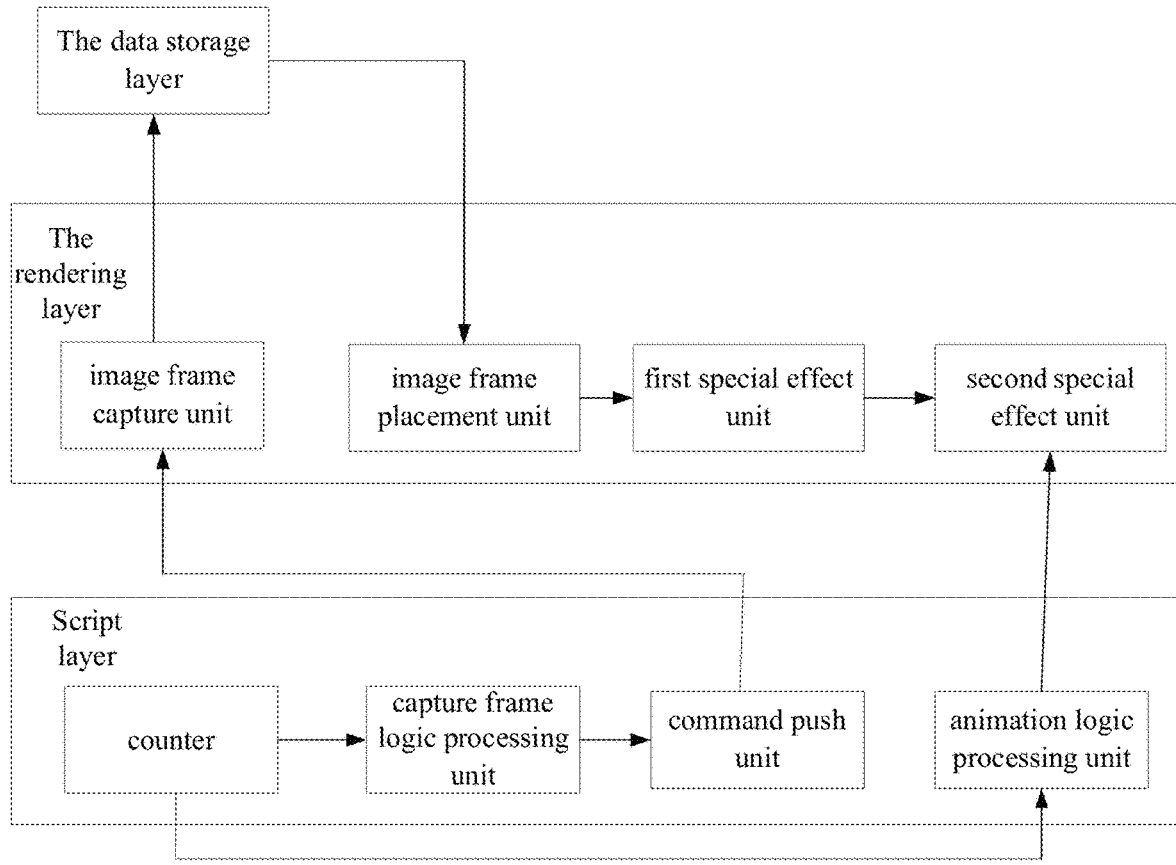
FIG. 6 is a logical diagram for performing special effect processing on a video according to an embodiment of the present disclosure.

As shown in FIG. 6, which shows the image effects processing logic.

The data storage layer is used to store historical images. For example, the data storage layer may comprise a cache in which historical images are stored for fast access.

The rendering layer comprises an image frame capture unit, an image frame placement unit, a first special effect unit, and a second special effect unit. The image frame capture unit is used to capture an image from video and store image frames captured from video to the data storage layer. image frame placement unit is used to retrieve historical images from the data storage layer. The first special effect unit is used to render historical images. The second special effect unit is used to render a new image after combining the historical image with the current image.

Script layer comprises counter, capture frame logic processing unit, command push unit and animation logic processing unit. The script layer contains the script program and the script files required for the script program to run. The rendering layer is controlled by the logic in the setup script. Among them, the counter is used to calculate the time of video special effect processing, such as capturing frames, placing frames, combining images, etc. The capture processing logic unit is used to determine the timing of the capture. The command push unit is used to send data capture or fetch commands to the rendering layer. Animation logic processing is used to indicate how the historical image and the current image are combined; For example, the video image frame is processed by Gaussian blur and then rendered. For example, a video image frame is tinted and then rendered.

In fact, this disclosure provides a framework for image special effects processing, under which only modification of the rendering unit and script layer is required to achieve special effects. It should be noted that the window method shown in FIG. 4 is an example effect implemented using the framework provided in FIG. 6.

The invention claimed is:

1. A method for performing special effect processing on an image, comprising:
    acquiring a video;
    setting a movable window in a video playing interface of playing the video, wherein the movable window is configured to move from a side to another side of the video playing interface for a plurality of rounds during playing the video;
    acquiring a first image from the video in response to determining that the movable window moves to a rightmost side of the video playing interface in a first round among the plurality of rounds, wherein the first image is a frame of the video being displayed when the movable window moves to the rightmost side of the video playing interface;
    determining a current image based on a current play progress of the video while the movable window moving in a second round among the plurality of rounds;
    generating a new image by combining the first image and the current image; and
    outputting the new image and displaying the new image on the video playing interface.

2. The method according to claim 1, further comprising: storing the first image in a cache.

3. The method according to claim 1, wherein the combining the first image and the current image into a new image comprises:
    determining a position of the movable window in a blank image; and
    drawing the movable window at the position, drawing a part of the first image outside the movable window, and drawing a part of the current image in the movable window.

4. The method according to claim 1, further comprising: controlling a movement period of the movable window in each of the plurality of rounds to be less than a time length of the video.

5. A device for performing special effect processing on an image, comprising:
    at least one processor; and
    at least one memory communicatively coupled to the at least one processor and storing instructions that upon execution by the at least one processor cause the device to perform operations comprising:
    acquiring a video;
    setting a movable window in a video playing interface of playing the video, wherein the movable window is configured to move from a side to another side of the video playing interface for a plurality of rounds during playing the video;
    acquiring a first image from the video in response to determining that the movable window moves to a rightmost side of the video playing interface in a first round among the plurality of rounds, wherein the first image is a frame of the video being displayed when the movable window moves to the rightmost side of the video playing interface;

determining a current image based on a current play progress of the video while the movable window moving in a second round among the plurality of rounds;

generating a new image by combining the first image and the current image; and outputting the new image and displaying the new image on the video playing interface.

6. The device according to claim 5, the operations further comprising:

storing the first image in a cache.

7. The device according to claim 5, wherein the combining the first image and the current image into a new image comprises:

determining a position of the movable window in a blank image; and drawing the movable window at the position, drawing a part of the first image outside the movable window, and drawing a part of the current image in the movable window.

8. The device according to claim 5, the operations further comprising:

controlling a movement period of the movable window in each of the plurality of rounds to be less than a time length of the video.

9. A non-transitory computer-readable storage medium, configured to store non-transitory computer-readable instructions that, when being executed by a computer, cause the computer to implement operations comprising:

acquiring a video;

setting a movable window in a video playing interface of playing the video, wherein the movable window is configured to move from a side to another side of the video playing interface for a plurality of rounds during playing the video;

acquiring a first image from the video in response to determining that the movable window moves to a rightmost side of the video playing interface in a first round among the plurality of rounds, wherein the first image is a frame of the video being displayed when the movable window moves to the rightmost side of the video playing interface;

determining a current image based on a current play progress of the video while the movable window moving in a second round among the plurality of rounds;

generating a new image by combining the first image and the current image; and outputting the new image and displaying the new image on the video playing interface.

10. The method according to claim 1, wherein the movable window is configured to move from a leftmost side to a rightmost side of the video playing interface in each of the plurality of rounds.

11. The method according to claim 1, further comprising:

automatically moving the movable window from a leftmost side of the video playing interface while starting to play the video.

12. The method according to claim 1, further comprising:

performing Gaussian blur processing on the first image to obtain a processed image; and generating the new image by combining the processed image and the current image.

13. The device according to claim 5, wherein the movable window is configured to move from a leftmost side to a rightmost side of the video playing interface in each of the plurality of rounds.

14. The device according to claim 5, the operations further comprising:

automatically moving the movable window from a leftmost side of the video playing interface while starting to play the video.

15. The device according to claim 5, the operations further comprising:

performing Gaussian blur processing on the first image to obtain a processed image; and generating the new image by combining the processed image and the current image.

16. The non-transitory computer-readable storage medium according to claim 9, wherein the movable window is configured to move from a leftmost side to a rightmost side of the video playing interface in each of the plurality of rounds.

17. The non-transitory computer-readable storage medium according to claim 9, the operations further comprising:

automatically moving the movable window from a leftmost side of the video playing interface while starting to play the video.

18. The non-transitory computer-readable storage medium according to claim 9, the operations further comprising:

performing Gaussian blur processing on the first image to obtain a processed image; and generating the new image by combining the processed image and the current image.

* * * * *